United States Patent
Nagarekawa et al.

(10) Patent No.: US 8,523,365 B2
(45) Date of Patent: Sep. 3, 2013

(54) LIGHT SOURCE DEVICE AND PROJECTOR

(75) Inventors: Satoru Nagarekawa, Matsumoto (JP); Kiyotaka Nakano, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 129 days.

(21) Appl. No.: 13/176,865

(22) Filed: Jul. 6, 2011

(65) Prior Publication Data

US 2012/0019790 A1    Jan. 26, 2012

(30) Foreign Application Priority Data

Jul. 22, 2010    (JP) .................. 2010-164596

(51) Int. Cl.
*G03B 21/16*    (2006.01)

(52) U.S. Cl.
USPC .................. 353/60; 353/57; 353/58; 353/61; 313/20; 313/24; 362/373

(58) Field of Classification Search
USPC ...................... 353/58, 57, 60, 61; 313/20, 24, 313/44, 113, 397; 362/373, 580, 547, 218, 362/264
See application file for complete search history.

(56) References Cited

U.S. PATENT DOCUMENTS

| | | | |
|---|---|---|---|
| 6,575,599 B1 * | 6/2003 | Imamura et al. | 362/294 |
| 8,029,168 B2 * | 10/2011 | Yamamoto et al. | 362/373 |
| 8,322,861 B2 * | 12/2012 | Tsai et al. | 353/57 |
| 2010/0033688 A1 * | 2/2010 | Obama et al. | 353/61 |
| 2010/0079731 A1 * | 4/2010 | Okada | 353/58 |
| 2010/0091252 A1 * | 4/2010 | Namba et al. | 353/61 |
| 2010/0103382 A1 | 4/2010 | Onodera et al. | |

FOREIGN PATENT DOCUMENTS

| | | |
|---|---|---|
| JP | 2005-010505 A | 1/2005 |
| JP | 2010-107574 A | 5/2010 |

* cited by examiner

*Primary Examiner* — Georgia Y Epps
*Assistant Examiner* — Sultan Chowdhury
(74) *Attorney, Agent, or Firm* — ALG Intellectual Property, LLC (57) ABSTRACT

A light source device includes: an arc tube having a bulb portion and a sealing portion; a reflector which fixes the arc tube; and a holding portion which holds the reflector, wherein the holding portion includes an inlet port, a partition provided between the inlet port and the arc tube, a pair of passages to which diverges in the partition and can circulate the cooling air to the arc tube, a first opening provided in the partition, and a shutter which is provided on that side of the partition where the inlet port is located, rotates about a rotation axis, and blocks a lower passage of the pair of passages, and on that side of the shutter where the rotation axis is located, a second opening is provided so as to overlap the first opening as seen from the inlet port.

10 Claims, 4 Drawing Sheets

LIGHT SOURCE DEVICE AND PROJECTOR

BACKGROUND

1. Technical Field

The present invention relates to light source devices and projectors.

2. Related Art

A light source device used in a projector includes an arc tube having a bulb portion emitting a luminous flux and a pair of sealing portions extending from the ends of the bulb portion. In the bulb portion of the arc tube, due to the influence of the thermal convection etc. caused when the light is emitted, the temperature rise in an upper portion is higher than that in a lower portion, which tends to cause a temperature difference between the upper and lower portions. Moreover, the temperature of the sealing portion located on the side to which the luminous flux is emitted also tends to rise. Therefore, it is desirable to reduce the temperature difference between the upper and lower portions of the bulb portion and cool the sealing portion and the like appropriately.

Incidentally, the projector is sometimes used in a stationary position in which the projector is placed on a desk or the like, and is sometimes used in a ceiling-hung position in which the projector is hung from a ceiling or the like in a state in which the projector is turned upside down. If the flow of the cooling air differs depending on the position, it becomes impossible to cool the arc tube appropriately in either of the two positions, which may shorten the life of the arc tube. For this reason, a projector which is so configured that the bulb portion and the sealing portion of the arc tube are cooled in the same manner in both positions has been proposed (see, for example, JP-A-2010-107574 (Patent Document 1)).

The projector described in Patent Document 1 has a duct portion that circulates the cooling air along an optical axis through an introduction port located on the side to which the luminous flux is emitted and, by bifurcating into two parts located above and below the arc tube, can circulate the cooling air through a first opening to the arc tube. In the bifurcation area of the duct portion, a current plate (a shutter) having a rotation axis which is orthogonal to the optical axis is provided so as to face the introduction port. Since the current plate blocks the duct located below the arc tube in both positions, the cooling air is guided by the duct located above the arc tube from the bifurcation area so as to flow through the first opening to the light-emitting portion (the bulb portion). Moreover, a second opening is provided on an arc tube's-side side face of the duct portion, whereby part of the cooling air circulating through the duct portion is made to flow in a direction which is orthogonal to the optical axis through the second opening toward the sealing portion located on the side to which the luminous flux is emitted.

However, in the projector described in Patent Document 1, since the direction in which the cooling air flows through the second opening provided in the side face of the duct portion toward the sealing portion is a direction which is orthogonal to the direction of the cooling air circulating through the duct portion through the introduction port, it is difficult for the cooling air to be guided through the second opening to the sealing portion. This may result in insufficient cooling of the sealing portion located on the side to which the luminous flux is emitted and cause breakage or deterioration of the arc tube.

SUMMARY

An advantage of some aspects of the invention is to solve at least part of the problems described above, and the invention can be implemented as forms or application examples described below.

APPLICATION EXAMPLE 1

A light source device according to this application example includes an arc tube having a bulb portion emitting a luminous flux and a sealing portion extending from the bulb portion to a side to which the luminous flux is emitted; a reflector which fixes the arc tube and reflecting the luminous flux; and a holding portion which holds the reflector, wherein the holding portion includes an inlet port provided in a position located lateral to the arc tube and introducing cooling air for cooling the arc tube in a direction which is orthogonal to an optical axis of the luminous flux, a partition provided between the inlet port and the arc tube, a pair of passages to which the top and bottom of the arc tube diverges in the partition and can circulate the cooling air to the arc tube, a first opening provided in the partition, and a shutter which is provided on that side of the partition where the inlet port is located, rotates about a rotation axis which is parallel to the optical axis, and blocks a lower passage of the pair of passages, and, on that side of the shutter where the rotation axis is located, a second opening is provided so as to overlap the first opening as seen from the inlet port.

With this configuration, the cooling air introduced through the inlet port provided in a position located lateral to the arc tube circulates through an upper passage of the pair of passages, the upper passage which is not blocked by the shutter, and flows to the arc tube. Moreover, part of the cooling air introduced through the inlet port flows to a position located lateral to the arc tube through the first opening provided in the partition. Therefore, in both the stationary position and the ceiling-hung position, it is possible to cool the arc tube from above and from a position located lateral to the arc tube.

Here, since the first opening is located between the inlet port and the arc tube, the direction in which the cooling air flows through the first opening to the arc tube is a direction along the direction in which the cooling air is introduced through the inlet port. As a result, the cooling air is easily guided to the arc tube through the first opening. Moreover, the shutter is provided on that side of the partition where the inlet port is located, and the second opening is provided on that side of the shutter where the rotation axis is located so as to overlap the first opening. Therefore, even in a state in which the lower passage is blocked by the shutter, the flow of the cooling air flowing through the inlet port to the first opening is rarely blocked by the shutter. As a result, it is possible to introduce the cooling air satisfactorily to the arc tube through the first opening. This makes it possible to reduce a temperature difference between the upper and lower portions of the arc tube and cool the arc tube more effectively, and thereby prevent breakage and deterioration of the arc tube.

APPLICATION EXAMPLE 2

In the light source device according to the application example described above, it is preferable that the rotation axis of the shutter be disposed at the level of roughly the center of the first opening in a vertical direction as seen from the inlet port.

With this configuration, since the rotation axis of the shutter is disposed in roughly the center of the first opening in a vertical direction, it is possible to make the size of the region in which the second opening and the first opening overlap in one position of the light source device almost the same as that in the other position in which the light source device is turned upside down. This makes it possible to introduce the cooling air satisfactorily to the arc tube through the first opening in the same manner in both the stationary position and the ceiling-hung position.

APPLICATION EXAMPLE 3

In the light source device according to the application example described above, it is preferable that the rotation axis of the shutter be disposed at almost the same level as the optical axis as seen from the inlet port.

With this configuration, since the rotation axis of the shutter is disposed at almost the same level as the optical axis, it is possible to make the position of the region in which the second opening and the first opening overlap, the position relative to the arc tube, in one position of the light source device almost the same as that in the other position in which the light source device is turned upside down. This makes it possible to introduce the cooling air satisfactorily to the tip of the arc tube in the same manner in both the stationary position and the ceiling-hung position.

APPLICATION EXAMPLE 4

In the light source device according to the application example described above, it is preferable that the pair of passages can circulate the cooling air to the bulb portion, and the first opening be disposed so as to overlap the sealing portion as seen from the inlet port.

With this configuration, in both the stationary position and the ceiling-hung position, the bulb portion is cooled from above by the cooling air circulating through the upper passage of the pair of passages, and the sealing portion is cooled by the cooling air introduced through the first opening. This makes it possible to cool the arc tube appropriately and thereby prevent breakage and deterioration of the arc tube more effectively.

APPLICATION EXAMPLE 5

A projector according to this application example includes: the light source device described above; a light modulating device modulating a luminous flux emitted from the light source device; and a projection optical device projecting a modulated light from the light modulating device.

With this configuration, it is possible to provide a projector provided with a light source device in which breakage and deterioration of the arc tube are prevented.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
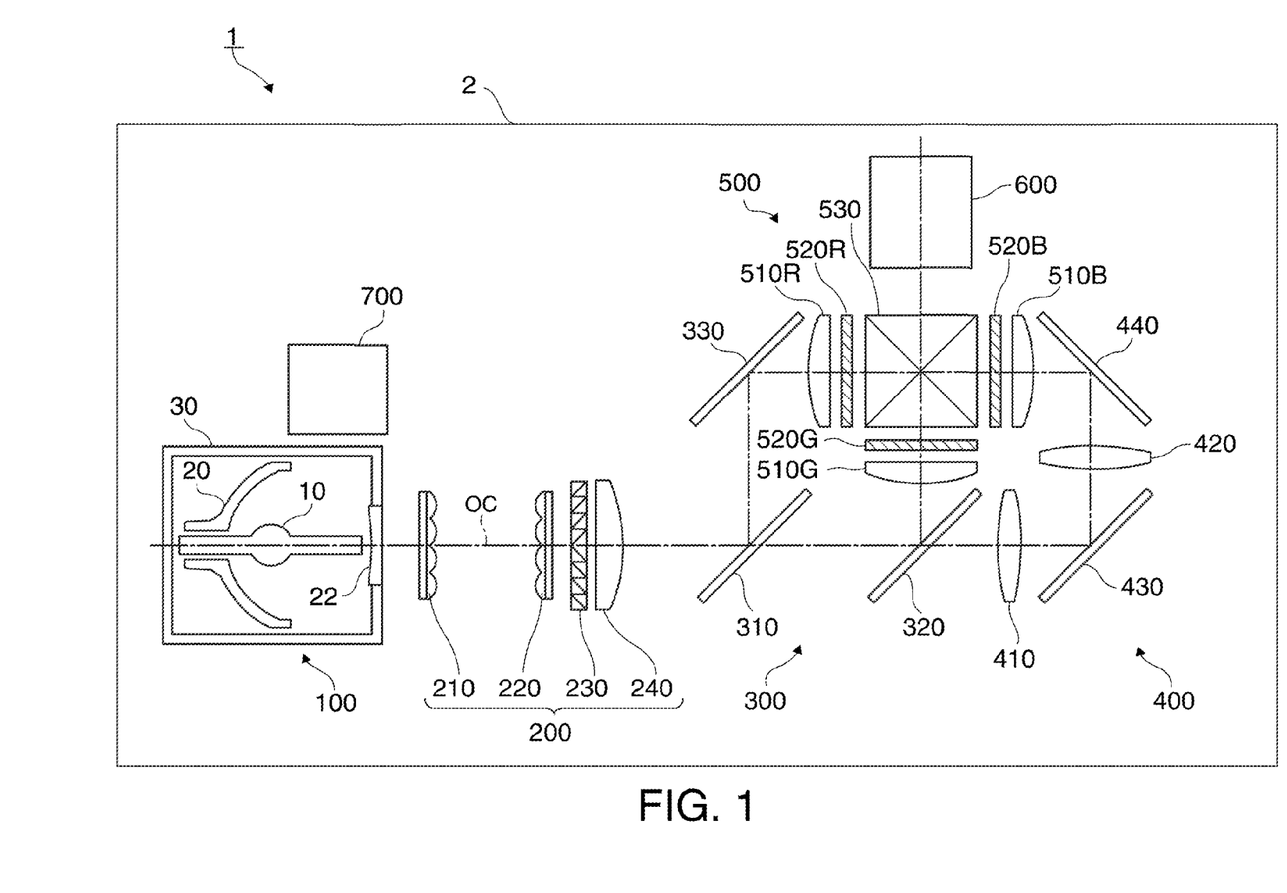
FIG. 1 is a schematic diagram showing a schematic configuration of a projector according to an embodiment.

Hereinafter, one embodiment of the invention will be described with reference to the drawings. Incidentally, in each of the drawings, the dimensional ratio, angle, etc. of each component element are appropriately changed to make the configuration easy to understand.
Projector
First, a projector according to this embodiment will be described with reference to FIG. 1. FIG. 1 is a schematic diagram showing a schematic configuration of a projector according to this embodiment. A projector 1 according to this embodiment modulates a luminous flux emitted from a light source according to image information, and enlarges the modulated luminous flux and projects it onto a projection surface such as a screen.

As shown in FIG. 1, the projector 1 includes a case 2, a light source device 100, an illumination optical device 200, a color separation optical device 300, a relay optical device 400, an electrooptical device 500, a projection optical device 600, and a cooling fan 700. The component elements are disposed in a horizontal direction in the case 2 and fixed.

Though not shown in the drawing, the projector 1 further includes, in the space in the case 2, a power-supply unit supplying power to the components provided in the projector 1 and a control unit controlling the components provided in the projector 1.

The light source device 100 includes an arc tube 10 emitting a luminous flux, a reflector 20, a parallelizing concave lens 22, and a holding portion 30. An illumination optical axis OC is a central axis of the luminous flux emitted from the light source device 100 to an illuminated region. The parallelizing concave lens 22 converts a converging light from the arc tube 10 into a parallel light and makes the resultant light travel to the illumination optical device 200. Incidentally, the detailed configuration of the light source device 100 will be described later.

The illumination optical device 200 includes a first lens array 210, a second lens array 220, a polarization conversion element 230, and a superimposing lens 240. The illumination optical device 200 divides the luminous flux emitted from the light source device 100 into a plurality of partial luminous fluxes, converts each of the partial luminous fluxes into virtually one type of polarized light, and superimposes the polarized light on the light incidence planes of three liquid crystal devices 520R, 520G, and 520B which are objects to be illuminated.

The color separation optical device 300 includes a first dichroic mirror 310, a second dichroic mirror 320, and a reflection mirror 330. The color separation optical device 300 separates the luminous flux exiting from the illumination optical device 200 into three colored lights: a red (R) light, a green (G) light, and a blue (B) light.

The relay optical device 400 includes a light incident-side lens 410, a relay lens 420, and reflection mirrors 430 and 440. The relay optical device 400 guides the B light separated by the color separation optical device 300 to the liquid crystal device 520B for B light. Incidentally, this embodiment adopts a configuration in which the relay optical device 400 guides the B light; however, the configuration is not limited thereto. For example, a configuration in which the relay optical device 400 guides the R light may be adopted.

The electrooptical device 500 includes field lenses 510R, 510G, and 510B, a light incident-side polarizer (not shown), liquid crystal devices 520R, 520G, and 520B as light modulating devices, a light exiting-side polarizer (not shown), and a cross dichroic prism 530. The light incident-side polarizer and the light exiting-side polarizer are provided for each of the liquid crystal devices 520R, 520G, and 520B.

The liquid crystal devices 520R, 520G, and 520B modulate the colored lights separated by the color separation optical device 300 according to the image information. The cross dichroic prism 530 is formed of four right-angle prisms bonded together and has a virtually square shape in a plan view, and, at the interface at which the right-angle prisms are bonded together, two dielectric multilayers are formed. The cross dichroic prism 530 combines the colored lights modulated by the liquid crystal devices 520R, 520G, and 520B, and makes the resultant light exit toward the projection optical device 600.

The projection optical device 600 is formed as a compound lens into which a plurality of lenses are combined. The projection optical device 600 enlarges the luminous flux obtained by the electrooptical device 500 in which the colored lights have been modulated and combined, and projects the luminous flux onto the projection surface such as a screen.

The cooling fan 700 is disposed so as to face an inlet port 32 (see FIG. 2A) of the light source device 100. The cooling fan 700 sends air (hereinafter referred to as cooling air) for cooling the arc tube 10 of the light source device 100. The cooling fan 700 is formed as a sirocco fan, for example.

The projector 1 is a projector which can be used in both a stationary position and a ceiling-hung position in which the projector 1 is turned upside down from the stationary position.

Light Source Device

Next, the light source device according to this embodiment will be described with reference to FIGS. 2A and 2B, FIGS. 3A and 3B, and FIGS. 4A to 4C. In the following drawings and description, a direction in which the luminous flux travels along the illumination optical axis OC is referred to as an X direction, and, of the directions orthogonal to the X direction, a direction along a horizontal direction, the direction which is a right direction as seen from an X-direction tip, is referred to as a Y direction. Furthermore, a direction which is orthogonal to the X direction and the Y direction and is an upper direction in the stationary position is referred to as a Z direction. That is, the directions represented by X, Y, and Z are orthogonal to one another.

Figure 2A:
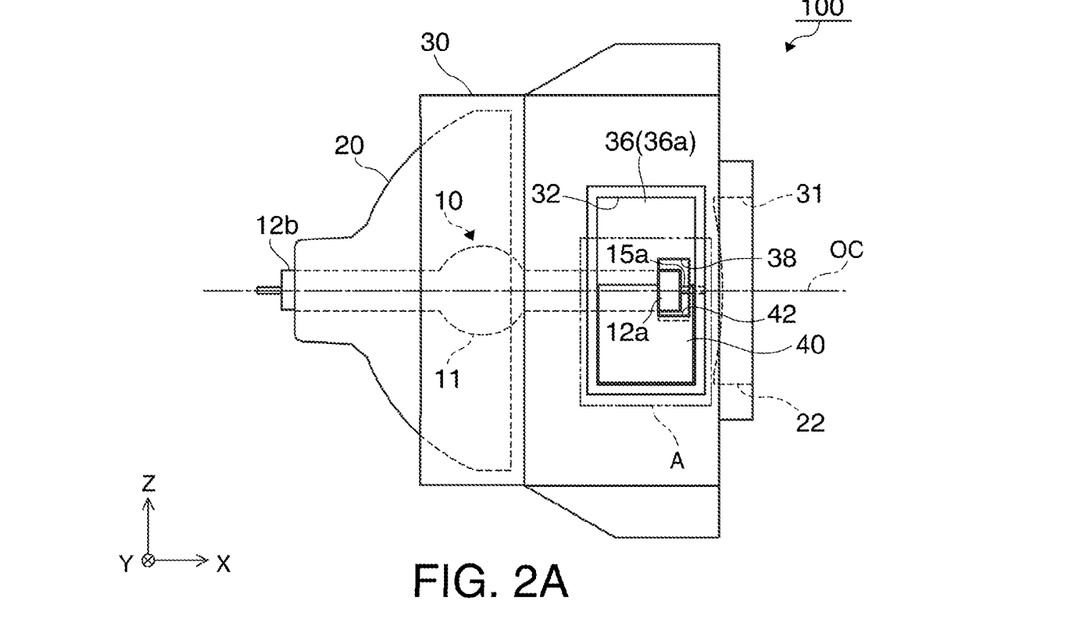
FIGS. 2A and 2B are diagrams each showing a schematic configuration of a light source device according to the embodiment.
Figure 2B:
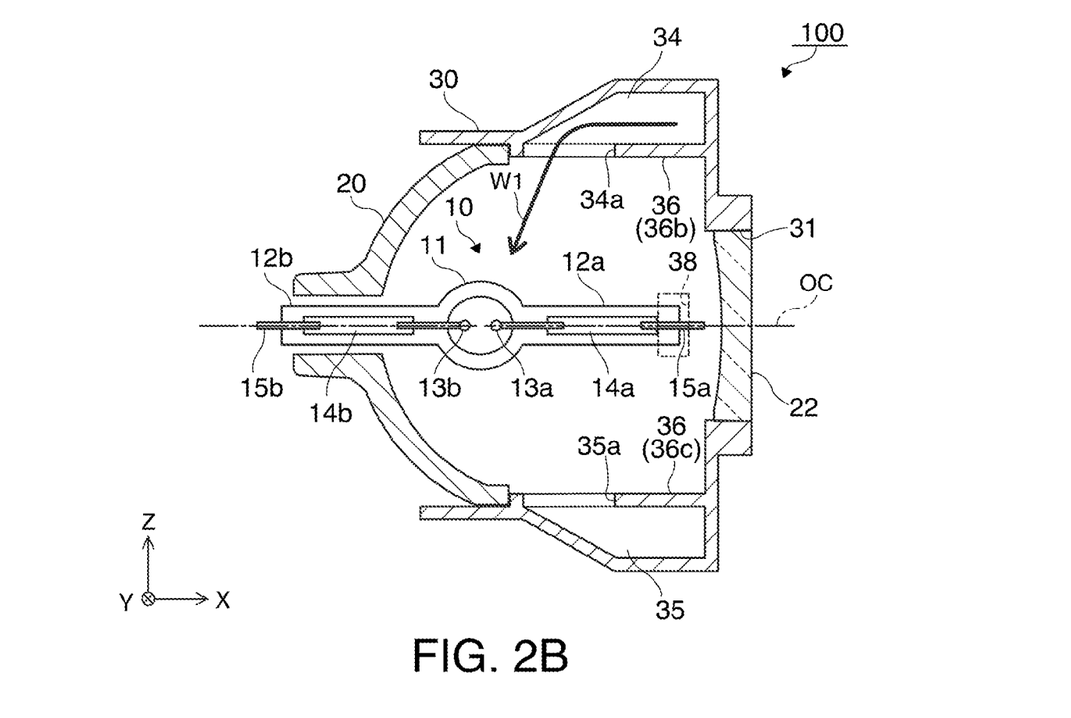
Figure 3A:
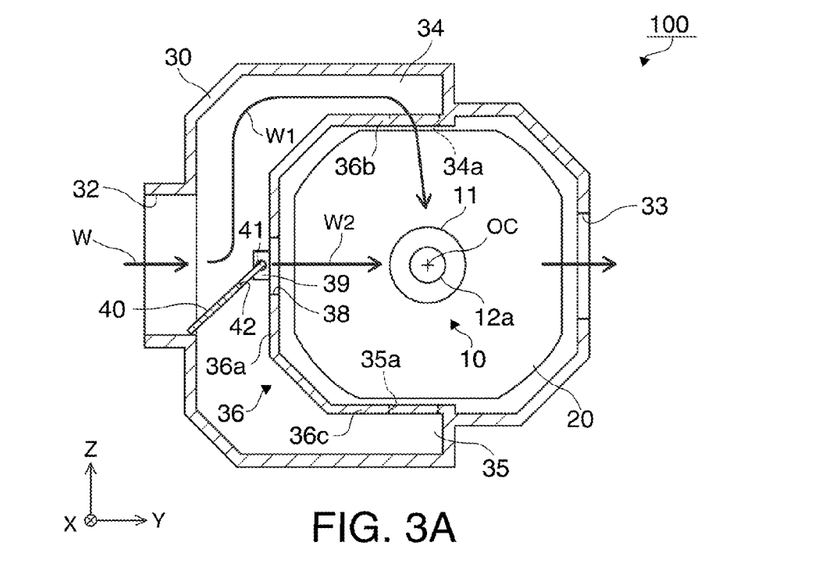
FIGS. 3A and 3B are diagrams each showing a schematic configuration of the light source device according to the embodiment.
Figure 3B:
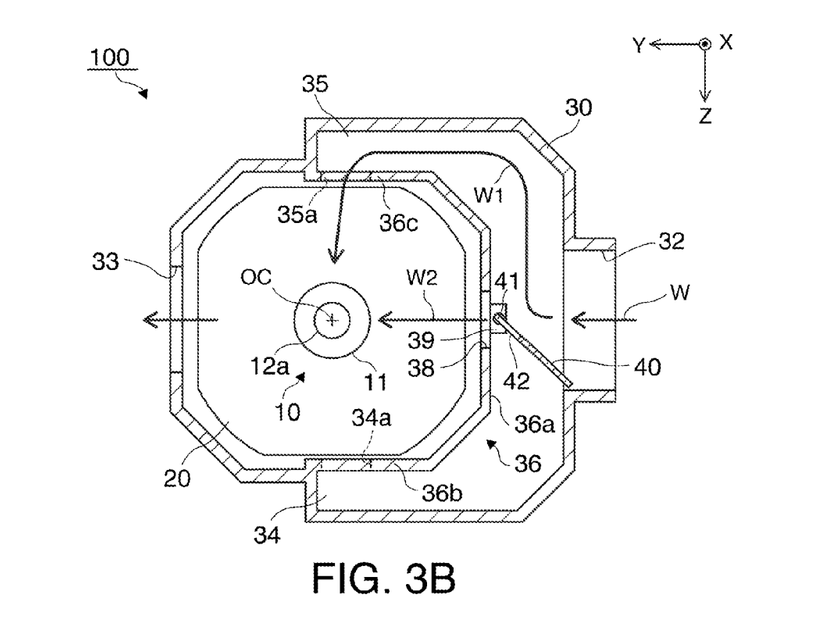

FIGS. 2A and 2B and FIGS. 3A and 3B are diagrams each showing a schematic configuration of the light source device according to this embodiment. Specifically, FIG. 2A is a side view of the light source device as seen from a Y-direction base end, and FIG. 2B is a sectional view of the light source device cut along a plane including the illumination optical axis OC in FIG. 2A, the plane along the Z direction. FIG. 3A is a diagram of the light source device as seen from the X-direction tip in the stationary position, and FIG. 3B is a diagram of the light source device as seen from the X-direction tip in the ceiling-hung position. Incidentally, FIGS. 3A and 3B show the cross-sections obtained when the light source device is cut along a plane formed of the Y direction and the Z direction and passing through an opening 42 of a shutter 40.

Figure 4A:
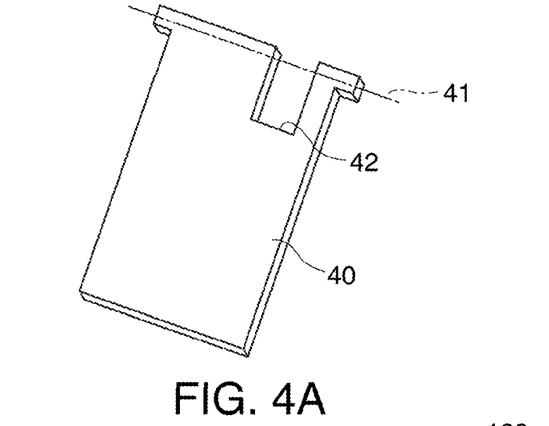
FIGS. 4A to 4C are diagrams each showing the configuration of a shutter according to the embodiment.
Figure 4B:
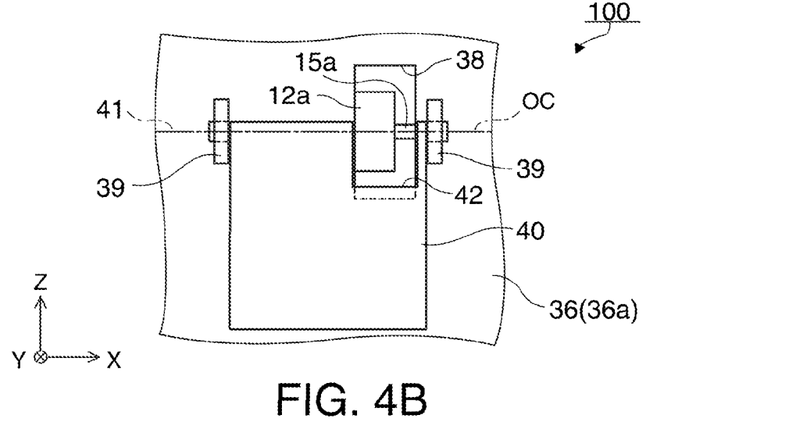
Figure 4C:
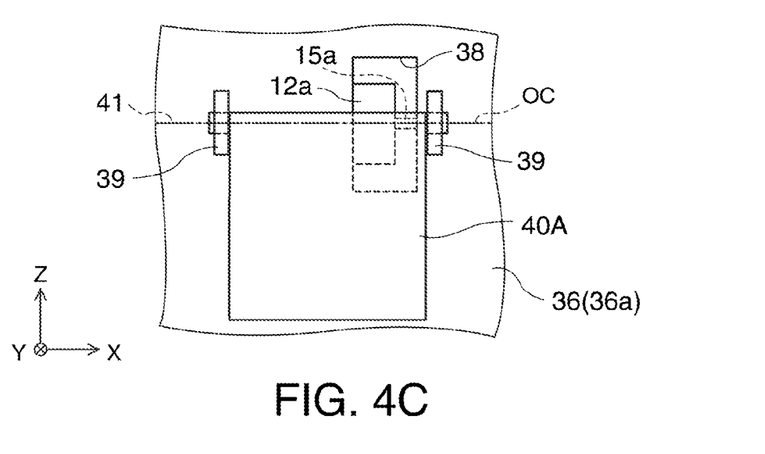

Moreover, FIGS. 4A to 4C are diagrams each explaining the configuration of the shutter according to this embodiment. Specifically, FIG. 4A is a perspective view of the shutter, FIG. 4B is an enlarged view of the A portion of FIG. 2A, and FIG. 4C is a diagram showing a comparative example of this embodiment. Incidentally, in FIGS. 4B and 4C, the inlet port is made see-through.

As shown in FIGS. 2A and 2B, the light source device 100 according to this embodiment includes the arc tube 10, the reflector 20, the parallelizing concave lens 22, and the holding portion 30.

The arc tube 10 has a bulb portion 11 which emits light, a pair of sealing portions 12a and 12b, a pair of electrodes 13a and 13b, a pair of metal leaves 14a and 14b, and a pair of leads 15a and 15b. As the arc tube 10, various kinds of arc tubes which emit high-intensity light can be adopted, and, for example, a high pressure mercury lamp, an ultra-high pressure mercury lamp, and a metal halide lamp can be adopted.

The sealing portions 12a and 12b extend from the bulb portion 11 toward the ends thereof along the illumination optical axis OC. The sealing portion 12a is disposed on that side of the bulb portion 11 where an illuminated region is located (the side to which a luminous flux is emitted), and the sealing portion 12b is disposed on the backside (the side opposite to the illuminated region) of the bulb portion 11. The bulb portion 11 and the sealing portions 12a and 12b are integrally formed of silica glass, for example. In the bulb portion 11, mercury, a noble gas, and a small amount of halogen, for example, are encapsulated.

The electrodes 13a and 13b are disposed in such a way that one end of the electrode 13a and one end of the electrode 13b, the ends encapsulated in the bulb portion 11, face each other. The electrodes 13a and 13b are formed of, for example, metal such as tungsten. The metal leaves 14a and 14b are encapsulated in the sealing portions 12a and 12b, respectively, and electrically connected to the electrodes 13a and 13b and the leads 15a and 15b, respectively, by welding or the like. The metal leaves 14a and 14b are formed of, for example, metal such as molybdenum. The leads 15a and 15b are formed of, for example, metal such as molybdenum and tungsten. When a voltage is applied to the leads 15a and 15b, a potential difference occurs between the electrodes 13a and 13b, and a discharge occurs in the bulb portion 11, whereby an arc image is generated.

The arc tube 10 generates heat as a result of emitting light, and, due to the influence of the thermal convection etc., the temperature rise in an upper portion (a Z-direction tip side) is higher than that in a lower portion. In particular, the temperature near the surface of the upper portion of the bulb portion 11 tends to rise. If insufficient cooling makes the temperature in the upper portion of the bulb portion 11 too high, the base material of the bulb portion 11 is recrystallized and becomes cloudy.

On the other hand, if too much cooling makes the temperature in the lower portion of the bulb portion 11 too low, the normal halogen cycle of the base material of the electrodes 13a and 13b is not performed, and the base material attaches to the inner wall of the bulb portion 11 and becomes blackened. If the base material becomes cloudy or blackened, the portion which becomes cloudy or blackened loses clarity, whereby the amount of light emitted from the bulb portion 11 is decreased, and a rise in the temperature of the bulb portion 11 causes breakage or deterioration of the arc tube 10. Therefore, it is desirable to prevent a temperature difference between the upper and lower portions by cooling the arc tube 10 from the upper portion side of the bulb portion 11.

Moreover, the temperature of the sealing portion 12a located on the illuminated region side also tends to rise, and the temperature rise in a connection between the metal leaf 14a and the lead 15a, for example, is higher than that of the other portions. If these portions are cooled insufficiently, the metal leaf 14a becomes oxidized and blackened and absorbs the luminous flux more easily. As a result, the temperature further rises, causing breakage or deterioration of the arc tube 10. Therefore, when the arc tube 10 is cooled, it is desirable to cool not only the bulb portion 11 but also the sealing portion 12a effectively.

The reflector 20 has a reflecting portion having a reflecting surface on the inner surface facing the arc tube 10. As the material of the reflector 20, crystallized glass or alumina ($Al_2O_3$), for example, can be suitably used. On the reflecting surface, a visible light reflection layer formed of a dielectric multilayer of titanium oxide ($TiO_2$) and silicon oxide ($SiO_2$), for example, is formed.

The reflecting portion of the reflector 20 has, for example, a shape of almost one-half of an oval sphere obtained by rotating an ellipsoid about the illumination optical axis OC as a central axis of rotation. The reflecting portion is disposed so that the bulb portion 11 is located near a first focus with respect to the arc tube 10, and reflects the light emitted from the bulb portion 11 toward a second focus position on the illuminated region side. An insertion hole is formed on the back of the reflector 20, and the sealing portion 12b is placed through the insertion hole and is fixed with an adhesive or the like. In this way, the arc tube 10 is fixed to the reflector 20.

The holding portion 30 is provided so as to surround the reflector 20 and holds the reflector 20. The holding portion 30 is formed into a virtually cylindrical shape by using a heat-resistant synthetic resin material, for example. Incidentally, the holding portion 30 may be integrally formed with portions such as a partition 36, which will be described later, and an external wall, or may be formed by combining a plurality of individual members.

The holding portion 30 includes an inlet port 32 located upstream of the cooling air, a pair of passages 34 and 35 that can circulate the cooling air, the partition 36 that diverges a passage into the passages 34 and 35, the shutter 40 that selectively closes one of the passages 34 and 35, an exhaust port 33 (see FIGS. 3A and 3B) located downstream of the cooling air, an opening 31, an opening 38 as a first opening, and the opening 42 as a second opening.

The opening 31 is provided in the central portion of an illuminated region-side end of the holding portion 30. In the opening 31, the parallelizing concave lens 22 is held.

The inlet port 32 is provided on the illuminated region-side of the reflector 20 and in a position located lateral to the arc tube 10, that is, the Y-direction base end side thereof (see FIG. 3A). The inlet port 32 is disposed so as to face the cooling fan 700 (see FIG. 1), and the cooling air sent from the cooling fan 700 is introduced into the holding portion 30 through the inlet port 32 along the Y direction.

The inlet port 32 is disposed so that the illumination optical axis OC is relatively located the center of the inlet port 32 in the vertical direction (the Z direction). That is, the inlet port 32 is disposed so as to be vertically symmetric with respect to the illumination optical axis OC. By disposing the inlet port 32 in this way, it is possible to introduce the cooling air at almost the same level (a position in the Z direction) in both the stationary position and the ceiling-hung position.

As shown in FIG. 3A, the exhaust port 33 is disposed on the Y-direction tip side, that is, the side opposite to the inlet port 32 with the arc tube 10 placed between the exhaust port 33 and the inlet port 32. The cooling air which has cooled the arc tube 10 is exhausted through the exhaust port 33 to the outside of the holding portion 30. As is the case with the inlet port 32, the exhaust port 33 is also disposed so as to be vertically symmetric with respect to the illumination optical axis OC. With such an inlet port 32 and an exhaust port 33, it is possible to introduce and exhaust the cooling air under almost the same conditions in both the stationary position and the ceiling-hung position. Incidentally, though not shown in the drawing, a metal mesh is placed on the inlet port 32 and the exhaust port 33 for dust prevention.

The partition 36 has a partition portion 36a provided along the Z direction between the inlet port 32 and the arc tube 10 and partition portions 36b and 36c extending along the Y direction above and below the partition portion 36a. An end of each of the partition portions 36b and 36c makes contact with the external wall of the holding portion 30 on the side closer to the Y-direction tip than the illumination optical axis OC. In the partition portion 36a, the opening 38 and a pair of supporting portions 39 are provided.

The opening 38 is disposed so as to overlap the sealing portion 12a as seen from the inlet port 32, that is, the Y-direction base end and so as to be vertically symmetric with respect to the illumination optical axis OC (see FIG. 2A). The opening 38 diverges part of the cooling air introduced through the inlet port 32 and guides that part to the sealing portion 12a.

Incidentally, this embodiment shows an example in which the opening 38 is disposed so as to overlap the tip of the sealing portion 12a as seen from the inlet port 32 so that the tip of the sealing portion 12a is effectively cooled; however, the placement of the opening 38 is not limited to this example. The opening 38 may be disposed so as to overlap an intended portion of the sealing portion 12a, such as the connection between the metal leaf 14a and the lead 15a.

The pair of supporting portions 39 is disposed on both sides of the opening 38 in the X direction, and pivotally supports a rotation axis 41 of the shutter 40 (see FIG. 4B).

The passages 34 and 35 are provided on the illuminated region side of the reflector 20 in such a way as to diverge, at the partition portion 36a, from the inlet port 32 into parts located above and below the arc tube 10. The passages 34 and 35 are provided virtually in the form of the letter L as seen from the X direction, and are disposed so as to be vertically symmetric with respect to the illumination optical axis OC. The passages 34 and 35 each have an upstream part extending along the Z direction and a downstream part extending along the Y direction, and each have a downstream termination located on the side closer to the Y-direction tip than the illumination optical axis OC.

In the partition portions 36b and 36c, openings 34a and 35a are respectively provided. The openings 34a and 35a are disposed so as to face each other with the arc tube 10 placed between the openings 34a and 35a as seen from the X-direction tip. The openings 34a and 35a are located at the downstream terminations of the passages 34 and 35, respectively. Moreover, as shown in FIG. 2B, the openings 34a and 35a are each disposed on the side near the bulb portion 11 than the opening 38 (indicated by a dashed line in FIG. 2B) as seen from the Y-direction base end. As a result, the cooling air introduced through the inlet port 32 and circulating through the upper passage of the passages 34 and 35 is guided through the upper opening of the openings 34a and 35a to the bulb portion 11.

As shown in FIG. 3A, the shutter 40 is provided on that side of the partition portion 36a where the inlet port 32 is located. That is, the shutter 40 is disposed on a more upstream side than the opening 38 in the flow of the cooling air flowing through the inlet port 32. As shown in FIG. 4A, the shutter 40 is a plate-like member having a virtually rectangular shape, and has, at one end thereof, the rotation axis 41 and the opening 42.

As shown in FIG. 4B, the ends of the rotation axis 41 in the axial direction are pivotally supported rotatably by the pair of supporting portions 39. The rotation axis 41 is parallel to the illumination optical axis OC, and the center of the axis is disposed at almost the same level as the illumination optical axis OC in the vertical direction (the Z direction) as seen from the inlet port 32 (the Y-direction base end). That is, the rotation axis 41 is disposed at the level of roughly the center of the opening 38 in the Z direction.

The shutter 40 rotates about the rotation axis 41 under its own weight by the action of gravity both when the projector 1 is turned upside down from the stationary position to the ceiling-hung position and when the projector 1 is turned upside down from the ceiling-hung position to the stationary position, and comes to rest in a position where the tip (the side opposite to the rotation axis 41) of the shutter 40 makes contact with the inner wall of the inlet port 32. As a result, the lower passage of the passages 34 and 35 is closed, and the cooling air introduced through the inlet port 32 circulates through the upper passage (see FIGS. 3A and 3B).

The opening 42 is provided by making a notch on that side of the shutter 40 where the rotation axis 41 is located. The opening 42 is disposed in a position in which the opening 42 overlaps the opening 38 as seen from the inlet port 32, that is, the Y-direction base end. The opening 42 is provided so that part of the cooling air flowing through the inlet port 32 to the opening 38 is not blocked by the shutter 40.

As shown in FIG. 4C as a comparative example, if the opening 42 is not provided in a shutter 40A, a region of the opening 38, the region which overlaps the shutter 40A as seen from the inlet port 32, is covered with the shutter 40A. Moreover, since the center of the rotation axis 41 is at almost the same level as the illumination optical axis OC, a portion located below the central portion of the sealing portion 12a in the Z direction (the position in which the metal leaf 14a and the lead 15a are disposed with the illumination optical axis OC located at the center) is covered with the shutter 40A as seen from the inlet port 32. As a result, the cooling air flowing through the inlet port 32 to the opening 38 is blocked by the shutter 40A and the flow rate thereof decreases, and it is difficult for the cooling air to flow toward the central portion of the sealing portion 12a.

On the other hand, in this embodiment shown in FIG. 4B, since the opening 42 is provided in the shutter 40, the cooling air flowing through the inlet port 32 to the opening 38 is rarely blocked, whereby a decrease in the flow rate of the cooling air is prevented. Moreover, since the opening 42 is provided by making a notch on that side of the shutter 40 where the rotation axis 41 is located, even when the projector 1 is turned upside down, it is also possible to make the cooling air flow toward the central portion of the sealing portion 12a in the Z direction (the position in which the metal leaf 14a and the lead 15a are disposed) in a similar way.

Flow of Cooling Air

Next, the flow of the cooling air according to this embodiment will be described with reference to FIGS. 2A and 2B and FIGS. 3A and 3B. In the stationary position, as shown in FIG. 3A, the Z-direction tip side serves as the upper part in the vertical direction, and the Y-direction tip side as seen from the X-direction tip serves as the right. Therefore, the passage 34 and the opening 34a are disposed above the arc tube 10, and the passage 35 and the opening 35a are disposed below the arc tube 10. The passage 35 located below the arc tube 10 is blocked by the shutter 40.

The cooling air sent from the cooling fan 700 (see FIG. 1) is introduced into the bifurcation area of the passages 34 and 35 through the inlet port 32 along the Y direction as indicated by an arrow W. Since the passage 35 is blocked by the shutter 40, the cooling air circulates through the passage 34 located above the arc tube 10 and is guided to the arc tube 10 through the opening 34a as indicated by an arrow W1.

At this time, as indicated by the arrow W1 in FIG. 2B, the cooling air which has circulated through the passage 34 and has been guided through the opening 34a produces a downward current moving toward the bulb portion 11. This downward current cools the bulb portion 11 from above. As a result, since the temperature in the upper portion of the bulb portion 11 is prevented from becoming too high and the temperature in the lower portion of the bulb portion 11 is prevented from becoming too low, it is possible to perform cooling effectively by preventing a temperature difference between the upper and lower portions of the bulb portion 11.

Moreover, as indicated by an arrow W2 in FIG. 3A, part of the cooling air introduced through the inlet port 32 is guided through the opening 38 to the arc tube 10 along the Y direction. Since the opening 38 is disposed in a position in which the opening 38 overlaps the tip of the sealing portion 12a as seen from the inlet port 32, a flow of the cooling air to the tip of the sealing portion 12a is formed as indicated by the arrow W2 (see FIG. 2A).

Here, the direction in which the cooling air flows to the tip of the sealing portion 12a through the opening 38 is almost the same as the direction of the cooling air introduced through the inlet port 32. Therefore, as compared to a configuration in which the direction in which the cooling air flows to the tip of the sealing portion is orthogonal to the direction of the cooling air introduced through the inlet port as in the projector described in Patent Document 1, in the light source device 100 of this embodiment, the cooling air easily flows through the opening 38. In addition, since the opening 42 is provided in the shutter 40 located on a more upstream side than the opening 38 in a position in which the opening 42 overlaps the opening 38 as seen from the inlet port 32, the flow of the cooling air flowing to the opening 38 is rarely blocked by the shutter 40. This makes it possible to cool the tip of the sealing portion 12a more effectively.

Incidentally, in this embodiment, since the opening 38 is disposed so as to overlap the tip of the sealing portion 12a, the cooling air is guided to the tip of the sealing portion 12a. By disposing the opening 38 so as to overlap the other portion such as the connection between the metal leaf 14a and the lead 15a, it is possible to guide the cooling air to an intended portion and cool the portion effectively.

As described above, in the light source device 100 of this embodiment, it is possible to cool the bulb portion 11 and the sealing portion 12a more effectively. As a result, it is possible to prevent breakage and deterioration of the arc tube 10 more effectively. Moreover, since the amount of air required for cooling is reduced, it is possible to reduce the output of the cooling fan 700 and thereby realize power savings and reduction of noise. Furthermore, since the cooling air is easily guided to the sealing portion 12a, it is possible to make the opening 38 smaller than the second opening of the projector described in Patent Document 1.

The cooling air which has cooled the arc tube 10 (the bulb portion 11) along the flow indicated by the arrow W1 and the cooling air which has cooled the arc tube 10 (the sealing portion 12a) along the flow indicated by the arrow W2 are exhausted through the exhaust port 33 to the outside of the holding portion 30 as a result of the internal pressure of the holding portion 30 being increased due to the introduction of new cooling air.

On the other hand, in the ceiling-hung position, as shown in FIG. 3B, the Z-direction tip side serves as the lower part in the vertical direction, and the Y-direction tip side as seen from the X-direction tip serves as the left. Therefore, in the ceiling-hung position, the passage 35 and the opening 35a are disposed above the arc tube 10, and the passage 34 and the opening 34a are disposed below the arc tube 10. The passage 34 located below the arc tube 10 is blocked by the shutter 40.

Since the cooling air introduced through the inlet port 32 circulates through the passage 35 located above the arc tube 10 and is guided to the arc tube 10 through the opening 35a as indicated by an arrow W1, as is the case with the stationary position, a downward current moving toward the bulb portion 11 is formed. Moreover, since part of the cooling air introduced through the inlet port 32 is guided through the opening 38 as indicated by an arrow W2, as is the case with the stationary position, a flow of the cooling air flowing to the sealing portion 12a is formed.

Here, since the rotation axis 41 of the shutter 40 is disposed in roughly the center of the opening 38 in the Z direction, that is, at almost the same level as the illumination optical axis OC, even when the shutter 40 is rotated in the projector 1 turned upside down, the size of the region in which the opening 42 and the opening 38 overlap as seen from the inlet port 32 is almost the same as that in the stationary position. Moreover, it is possible to make the position of the region in which the opening 42 of the shutter 40 and the opening 38 overlap, the position relative to the arc tube 10 (the sealing portion 12a), almost the same as that in the stationary position. As a result, as is the case with the stationary position, also in the ceiling-hung position, it is possible to cool the upper portion of the bulb portion 11 and the sealing portion 12a effectively.

The cooling air which has cooled the bulb portion 11 and the sealing portion 12a of the arc tube 10 is exhausted through the exhaust port 33 to the outside of the holding portion 30.

With the configuration of the light source device 100 according to this embodiment, it is possible to achieve the following effects.

(1) In both the stationary position and the ceiling-hung position, since the cooling air is selectively introduced to a passage of the pair of passages 34 and 35, the passage located above the arc tube 10, by the shutter 40, a downward current moving toward the bulb portion 11 from above is formed. Moreover, the cooling air flows to the sealing portion 12a through the opening 38 provided in the bifurcation area of the passages 34 and 35. Since the direction in which the cooling air flows is a direction along the direction in which the cooling air is introduced through the inlet port 32, the cooling air is more satisfactorily introduced through the opening 38 as compared to a case in which the direction in which the cooling air flows to the sealing portion and the direction of the cooling air introduced through the inlet port intersect. This makes it possible to cool the bulb portion 11 and the sealing portion 12a effectively, making it possible to provide the light source device 100 that prevents breakage and deterioration of the arc tube 10 and the projector 1 provided with such a light source device 100. Moreover, it is also possible to reduce the output of the cooling fan 700 and thereby realize power savings and reduction of noise.

(2) Since the opening 42 is provided in the shutter 40 so as to overlap the opening 38, even in a state in which the lower passage is blocked by the shutter 40, the flow of the cooling air flowing through the inlet port 32 to the opening 38 is rarely blocked by the shutter 40. This makes it easy for the cooling air to flow to the opening 38 and thereby cool the sealing portion 12a more effectively.

(3) Since the rotation axis 41 of the shutter 40 is disposed in roughly the center of the opening 38 in the vertical direction, it is possible to make the size of the region in which the opening 42 of the shutter 40 and the opening 38 overlap in one position of the projector 1 almost the same as that in the other position in which the projector 1 is turned upside down. This makes it possible to introduce the cooling air satisfactorily to the sealing portion 12a through the opening 38 in the same manner in both the stationary position and the ceiling-hung position.

(4) Since the rotation axis 41 of the shutter 40 is disposed at almost the same level as the illumination optical axis OC, it is possible to make the position of the region in which the opening 42 of the shutter 40 and the opening 38 overlap, the position relative to the arc tube 10 (the sealing portion 12a), in one position of the projector 1 almost the same as that in the other position in which the projector 1 is turned upside down. This makes it possible to introduce the cooling air satisfactorily to the sealing portion 12a in the same manner in both the stationary position and the ceiling-hung position.

While the light source device and the projector according to the invention have been described based on the above embodiment, the invention is not limited thereto and various modifications can be made therein without departing from the spirit of the invention. The followings are some modified examples.

Modified Example 1

In the configuration of the light source device 100 of the embodiment described above, the arc tube 10 does not include a secondary mirror; however, the invention is not limited thereto. The arc tube 10 may be disposed on the illuminated region side of the bulb portion 11 and include a secondary mirror which reflects the light emitted from the bulb portion 11 to the bulb portion 11 (the reflecting surface of the reflector 20). Even when the arc tube 10 includes a secondary mirror, it is possible to achieve the same effects as those achieved in the embodiment described above.

Modified Example 2

The projector 1 in the embodiment described above is a transmissive projector provided with a transmissive liquid crystal device 520 which transmits light as a light modulating device, the transmissive liquid crystal device 520 whose luminous flux incidence plane is different from the luminous flux exiting plane; however, the invention is not limited thereto. The projector may be a reflective projector provided with a reflective liquid crystal device which reflects light, the reflective liquid crystal device whose luminous flux incidence plane is the same as the luminous flux exiting plane. Even when the invention is applied to the reflective projector, it is possible to achieve the same effects as those achieved with the transmissive projector.

Modified Example 3

The projector in the embodiment described above is a projector using three liquid crystal devices as the light modulating devices; however, the invention is not limited thereto. The invention can also be applied to, for example, a projector using one, two, or four or more liquid crystal devices.

Modified Example 4

In the configuration of the projector of the embodiment described above, the liquid crystal device is used as the light modulating device; however, the invention is not limited thereto. As the light modulating device, in general, a light modulating device which modulates the incident light according to the image information will suffice, and a micromirror light modulating device or the like may be used. As the micromirror light modulating device, a DMD (Digital Micromirror Device) (a trademark of Texas Instruments Inc.), for example, can be used.

Modified Example 5

The invention can be applied to a front projection projector which projects a projection image from the observer's side and a rear projection projector which projects a projection image from the side opposite to the observer's side.

Modified Example 6

In the embodiment described above, an example in which the light source device according to the invention is applied to the projector has been described; however, the invention is not limited thereto. The light source device of the invention can also be applied, for example, to other optical apparatuses such as an optical disk apparatus.

The present application claim priority from Japanese Patent Application No. 2010-164596 filed on Jul. 22, 2010, which is hereby incorporated by reference in its entirety.

What is claimed is:

1. A light source device comprising:
an arc tube having a bulb portion emitting a luminous flux;
a sealing portion extending from the bulb portion to a side to which the luminous flux is emitted;
a reflector fixing the arc tube and reflecting the luminous flux; and
a holding portion holding the reflector, the holding portion including:
an inlet port positioned lateral to the arc tube and introducing cooling air into the holding portion in a direction which is orthogonal to an optical axis of the luminous flux;
a partition provided between the inlet port and the arc tube;
a pair of passages to which the top and bottom of the arc tube diverges in the partition, and can circulate the cooling air to the arc tube;
a first opening provided in the partition and through which a part of the cooling air from the inlet port passes; and
a shutter provided on that side of the partition where the inlet port is located, rotating around a rotation axis which is parallel to the optical axis, and blocking a lower passage of the pair of passages,
wherein the shutter has a second opening on a side of the shutter where the rotation axis is located, and
the second opening is provided so as to overlap the first opening as seen from the inlet port.

2. The light source device according to claim 1, wherein the rotation axis of the shutter is disposed at the level of roughly the center of the first opening in a vertical direction as seen from the inlet port.

3. The light source device according to claim 2, wherein the rotation axis of the shutter is disposed at almost the same level as the optical axis as seen from the inlet port.

4. The light source device according to claim 3, wherein the pair of passages can circulate the cooling air to the bulb portion, and
the first opening is disposed so as to overlap the sealing portion as seen from the inlet port.

5. A projector comprising:
the light source device according to claim 1;
a light modulating device modulating a luminous flux emitted from the light source device; and
a projection optical device projecting a modulated light from the light modulating device.

6. A projector comprising:
the light source device according to claim 2;
a light modulating device modulating a luminous flux emitted from the light source device; and
a projection optical device projecting a modulated light from the light modulating device.

7. A projector comprising:
the light source device according to claim 3;
a light modulating device modulating a luminous flux emitted from the light source device; and
a projection optical device projecting a modulated light from the light modulating device.

8. A projector comprising:
the light source device according to claim 4;
a light modulating device modulating a luminous flux emitted from the light source device; and
a projection optical device projecting a modulated light from the light modulating device.

9. The light source device according to claim 1, wherein the inlet portion, the first opening and the second opening are straightly arranged in a same direction.

10. A projector comprising:
the light source device according to claim 9;
a light modulating device modulating a luminous flux emitted from the light source device; and
a projection optical device projecting a modulated light from the light modulating device,
wherein the direction in which the inlet portion, the first opening and the second opening are arranged is perpendicular to the optical axis and parallel to projecting direction.

* * * * *